Nov. 17, 1959  R. C. NORRIE  2,913,252
VEHICLE SUSPENSION USING AIR SPRING
Filed Aug. 2, 1957  5 Sheets-Sheet 1
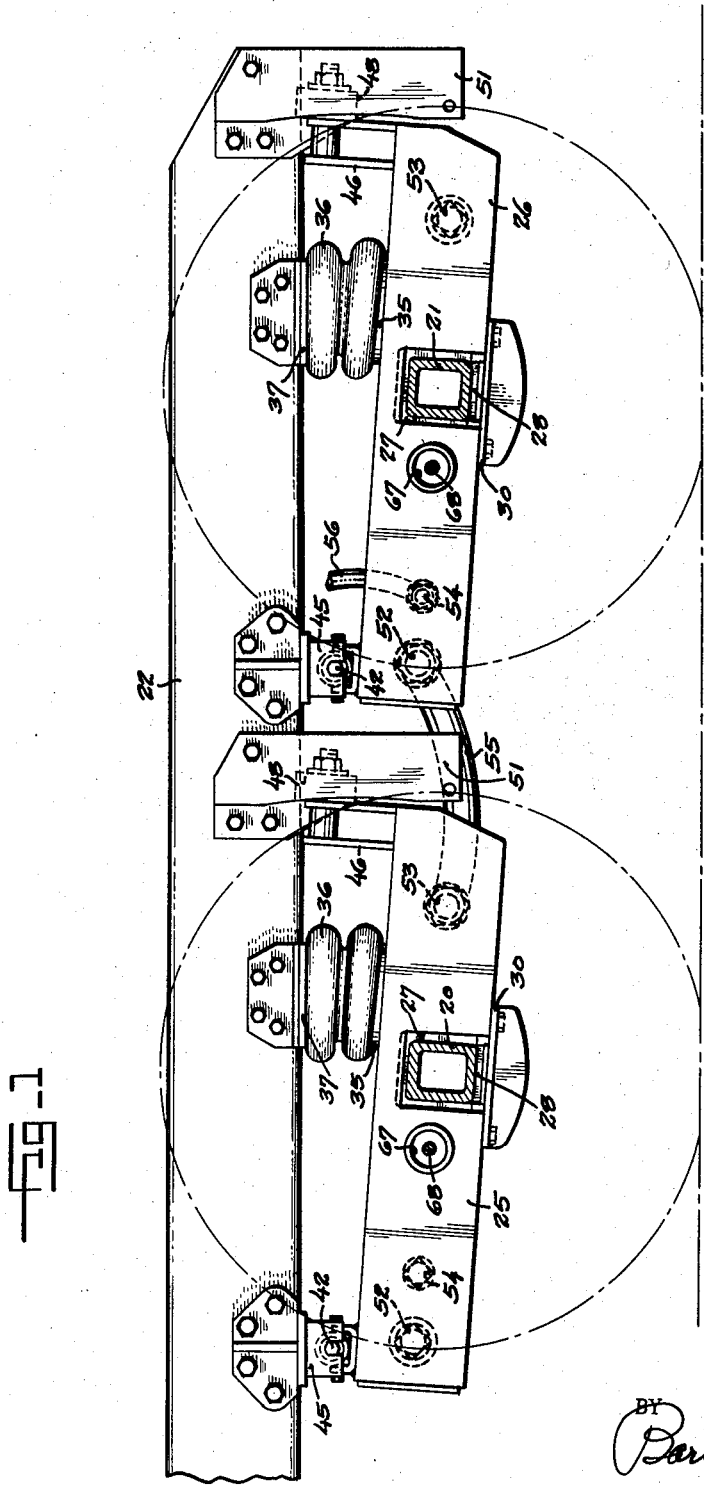
INVENTOR.
Robert C. Norrie
BY
Attorneys

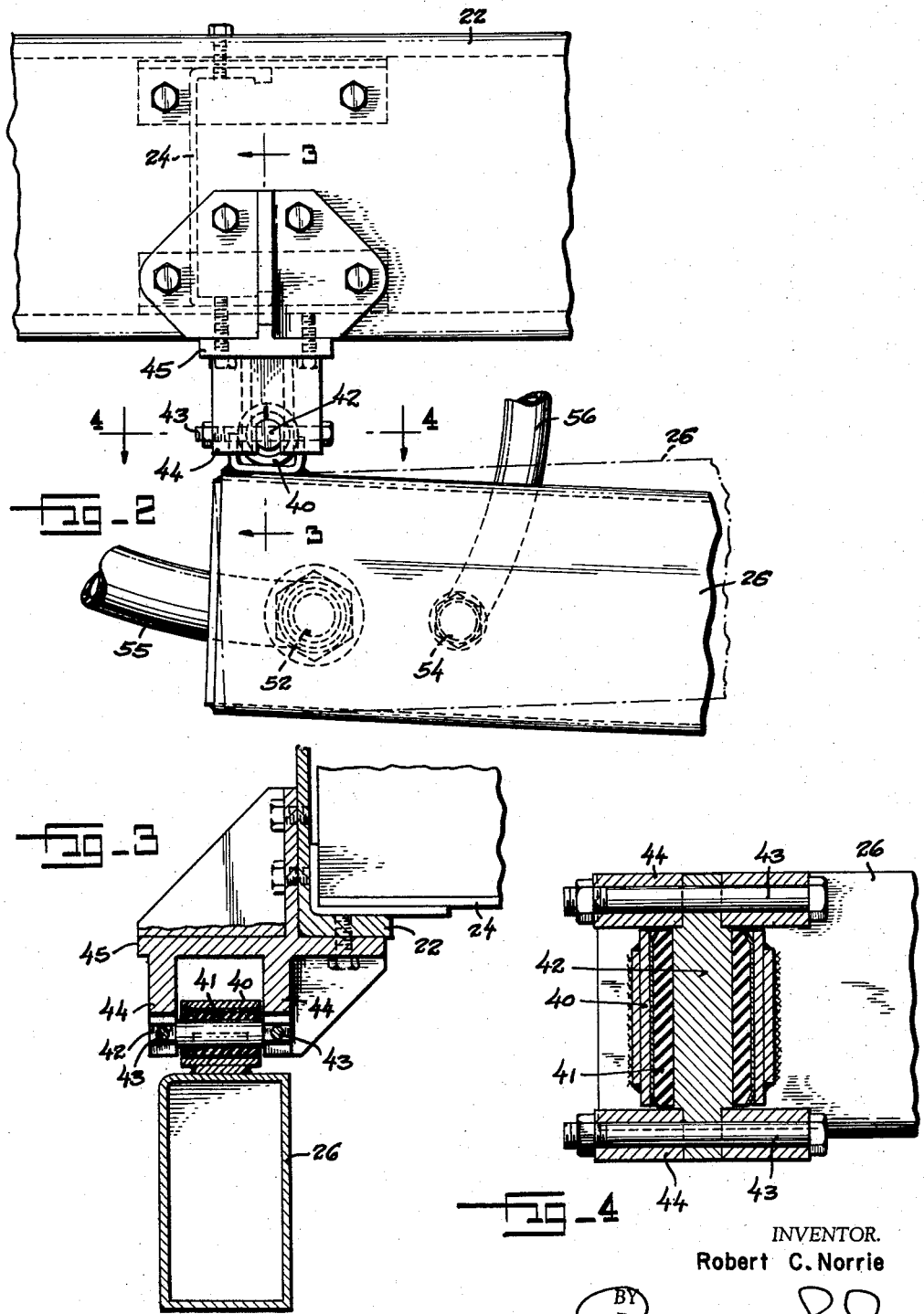

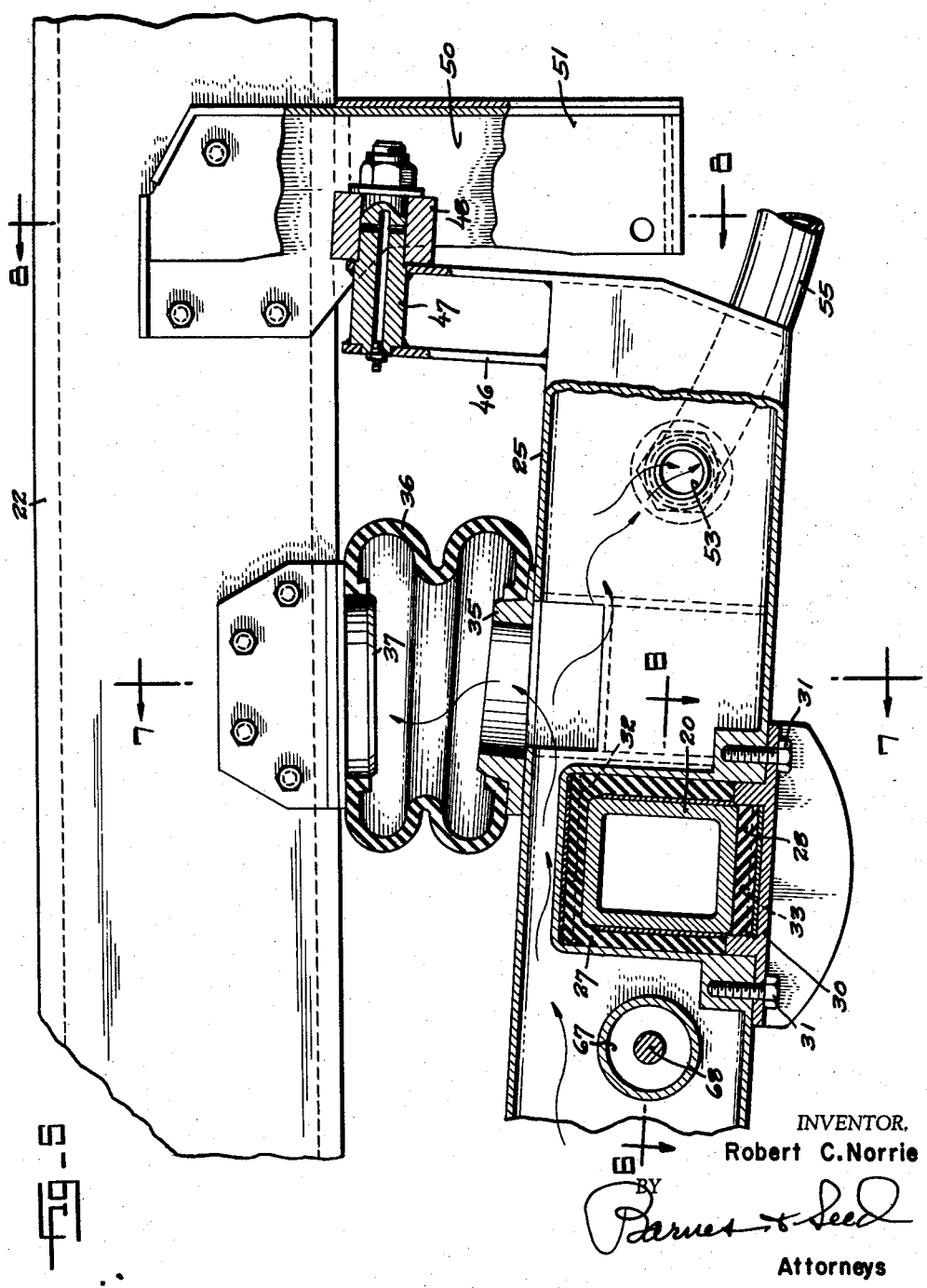

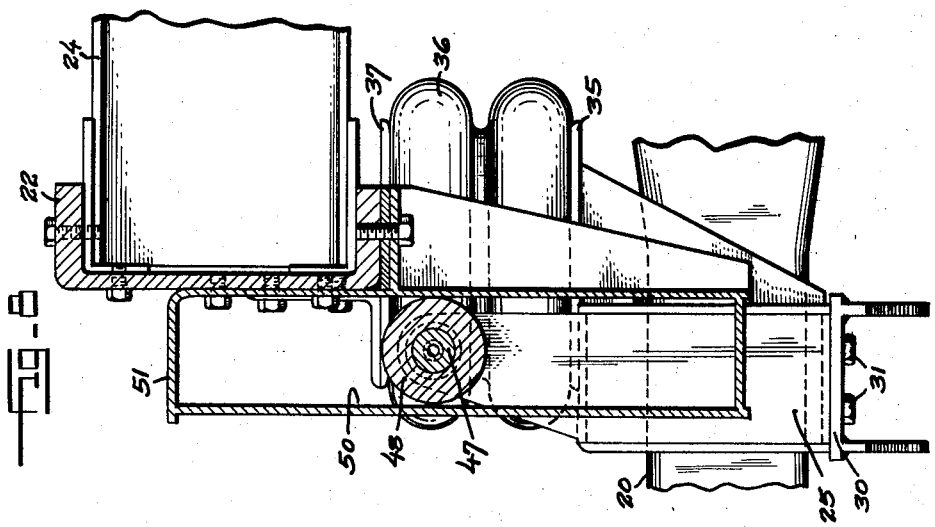
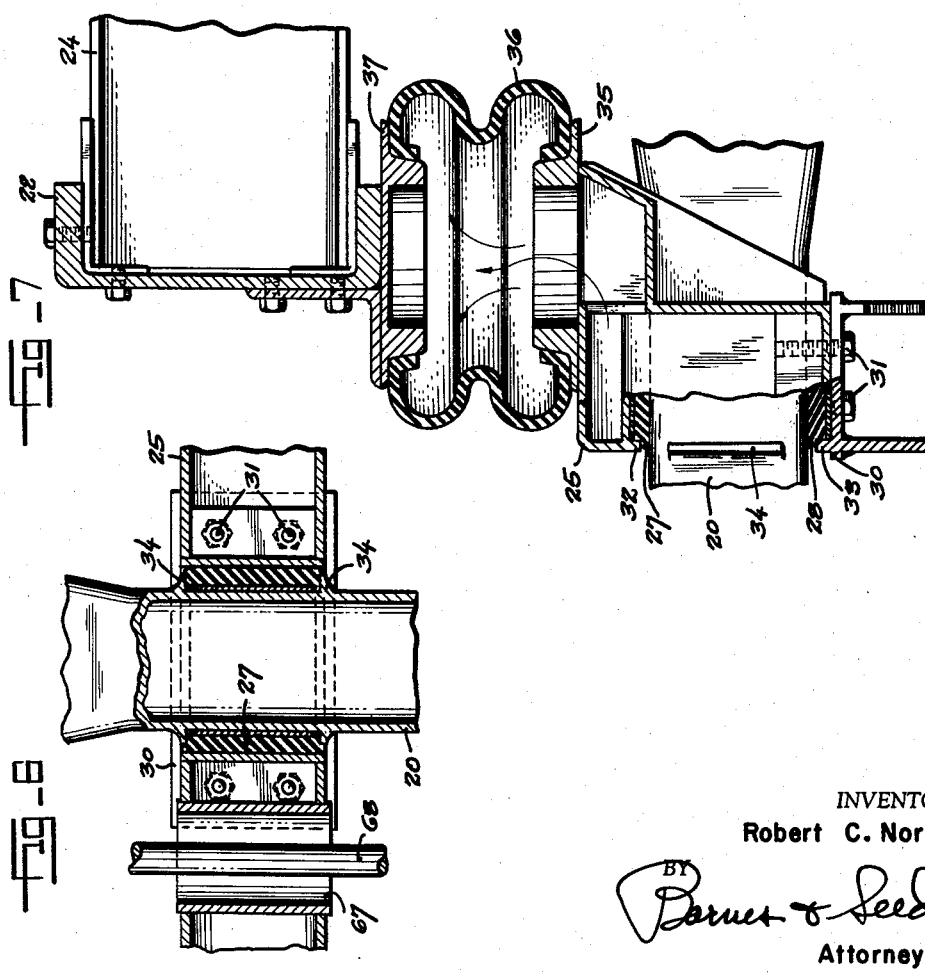

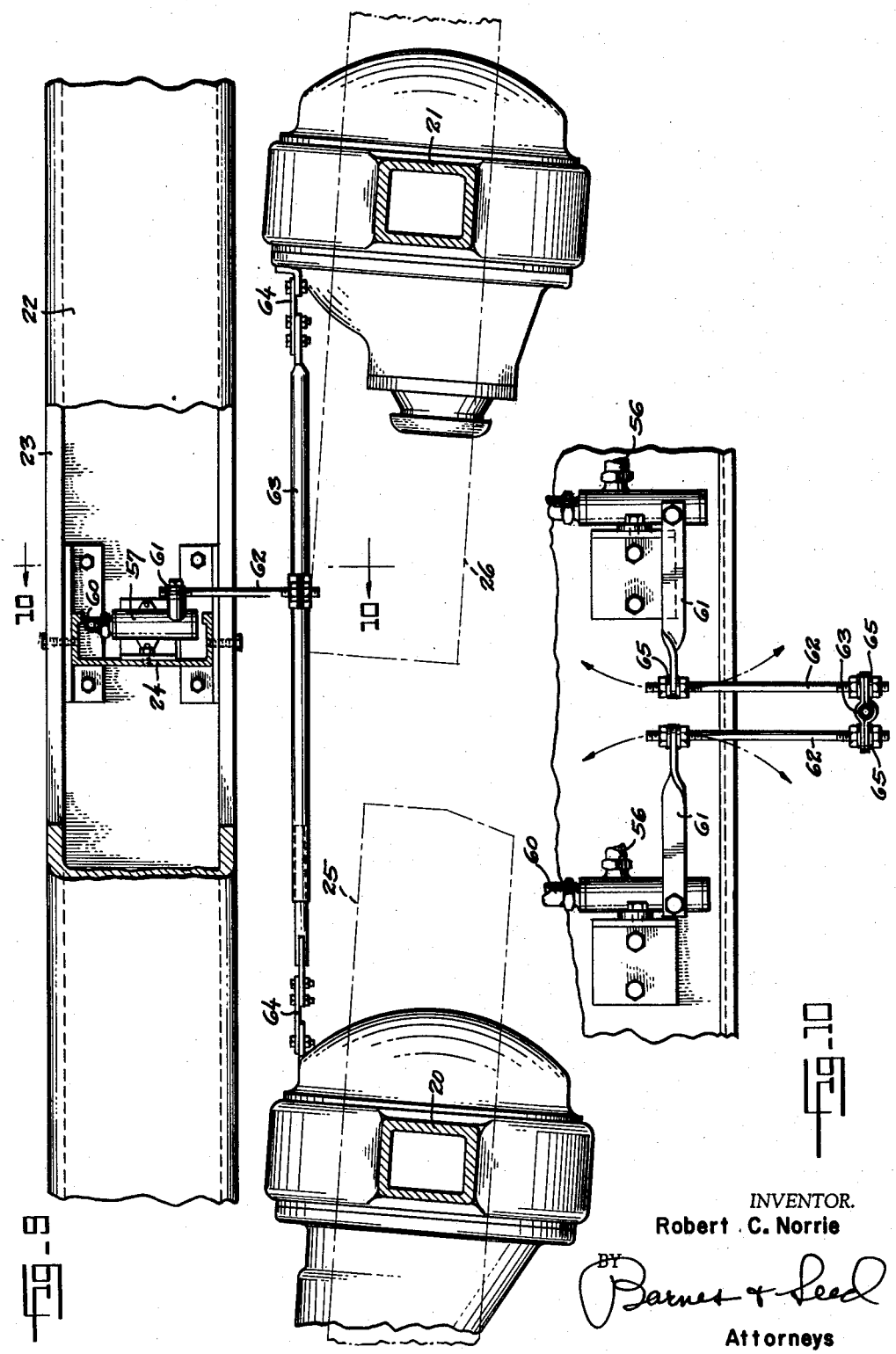

United States Patent Office 2,913,252
Patented Nov. 17, 1959

2,913,252

VEHICLE SUSPENSION USING AIR SPRING

Robert C. Norrie, Seattle, Wash., assignor to Pacific Car and Foundry Company, Seattle, Wash., a corporation of Washington Application August 2, 1957, Serial No. 676,035

3 Claims. (Cl. 280—104.5)

This invention relates to vehicle suspensions, particularly one including an air spring, for suspending the frame of a truck or trailer from the rear axle or axles, whether the latter be a single driving or a single trailer axle, two driving or two trailer axles, or a driving axle and a trailing axle.

The suspension system of the present invention is one in which, for each side of the vehicle, a respective air spring is interposed between the vehicle frame and a bolster or beam to which a related end of the axle is attached, and it is one object of the invention to hingedly connect this bolster to the frame in order that the bolster will perform the function of a radius rod holding the axle end to motion in an established transverse vertical arc of swing movement.

It is a further and particular object of the invention to provide a frame connection for the free end of the bolster guiding the bolster for swing motion in a vertical plane paralleling the longitudinal median line of the vehicle.

As a further object still the invention aims to provide a suspension system of the character described in which the axle end is so gripped by the bolster that braking and driving torques originating in the axle are carried through the bolster into the frame, and wherein these transferred torques are cushioned both in being passed from the axle into the bolster and from the bolster into the frame.

The invention has the yet further object of providing an air spring suspension system in which the bolster is in the form of an air-tight tank, with pressure air for the air spring being fed from a levelling valve into said tank and thence to the interior of the bellows which forms the air spring and, should the suspension be a tandem-axle hook-up, being also supplied from said tank to a companion tank from whence the same feeds to a second air spring for such second axle.

It is a still further object of the invention to provide a perfected air spring suspension of unusually simple construction which will withstand severe operating conditions and require little or no maintenance.

The above and yet additional objects and advantages in view will appear and be understood in the course of the following description and claims, the invention consisting in the novel construction and in the adaptation and combination of parts hereinafter described and claimed.

In the accompanying drawings:

Figure 1 is a fragmentary longitudinal vertical sectional view illustrating a suspension system constructed to embody preferred teachings of the present invention, the plane on which the section is taken lying exteriorly of the vehicle frame.

Fig. 2 is a fragmentary elevational view drawn to an enlarged scale and detailing the root-end mounting for one of the bolsters.

Fig. 3 is a fragmentary transverse vertical sectional view on line 3—3 of Fig. 2.

Fig. 4 is a fragmentary horizontal sectional view on line 4—4 of Fig. 2.

Fig. 5 is a fragmentary view partly in elevation and partly in longitudinal vertical section to detail the air spring proper and the free-end mounting for such bolster.

Fig. 6 is a fragmentary horizontal sectional view on line 6—6 of Fig. 5.

Fig. 7 is a fragmentary transverse vertical sectional view on line 7—7 of Fig. 5.

Fig. 8 is a fragmentary transverse vertical sectional view on line 8—8 of Fig. 5.

Fig. 9 is a longitudinal vertical sectional view detailing a control arrangement for the levelling valves of the system, the scale here used being larger than that of Fig. 1 but reduced from the scale which is employed in Figs. 2 through 8; and Fig. 10 is a fragmentary transverse vertical sectional view drawn to an enlarged scale on line 10—10 of Fig. 9.

Before proceeding with a detailed description of the invention it is here pointed out that the air spring suspension applied to one side of the vehicle is the same as that applied to the other side and hence a description of the one will suffice for the other.

Illustrated in said drawings is a vehicle having tandem rear axles 20 and 21 located below a vehicle frame having the usual right and left longitudinal principals 22—23 connected at spaced intervals of the length by transverse members 24.

The referred-to bolsters of the present invention are attached in saddling relation to the axles upon each of the ends thereof, and this is to say that a respective bolster saddles each end of each axle. There is thus a front bolster 25 and a rear bolster 26 at each side of the vehicle. These bolsters are comprised of air-tight tanks, and the saddle opening for the axle lies intermediate the ends. Such opening is substantially larger than the relatively square section of the axle received therein, and an elongated pad 27 of elastic rubber is introduced along the two sides and the top between said axle and the walls of the saddle opening. An elastic pad 28 is also applied below the axle, and compressing these rubber pads from below is a cap 30 bolted, as at 31, to the bolster. Lips 32 are provided by the bolster at the inner and outer sides of the saddle opening to retain the compressed rubber at the top, and similar lips 33 are provided by the cap to retain the compressed rubber at the bottom. The axle has ribs 34 formed along its sides to act in complement with the friction of the compressed rubber for holding the axle against lateral displacement relative to the bolster. Surmounting the bolster-forming tank above said axle connection there is provided an annular seat-plug 35 which communicates by its center with the interior of the bolster-forming tank, and a bellows 36 fits by its lower end on this plug. The upper end of such bellows fits over a complementing seat 37 bolted or otherwise rigidly secured in underlying relation to the frame principal 22 or 23, as the case may be.

The bolster is rigidly surmounted at its front end by a cylindrical wrist-piece 40, and a trunnion 42 is carried thereby with an intervening bonded bushing of elastic rubber 41. The projecting ends of this trunnion fit in are secured by bolts 43 in the slotted fork-arms 44 of a frame-carried bracket 45.

At its rear end the bolster is rigidly surmounted by an upright leg 46. A stud 47 is fixedly secured to the upper end of such leg, and a roller 48 is journaled on a rearwardly projecting end of this stud for rotation about a longitudinal horizontal axis. The roller tracks in the vertical guide slot 50 formed by a frame-carried slipper bracket 51.

The bolster-tanks for a like side of the vehicle are structurally identical and are thus enabled to be employed interchangeably either for a single axis vehicle or as the front or the rear bolster for a tandem axle vehicle. The tank has three openings within the length of its inner wall, two of which are designated by 52 and 53 and lie proximate one to one and the other to the other end of the tank, and the other of which, designated by 54, lies intermediate said end openings. The end openings are selectively used and their function is to join one tank to the other tank by a connecting hose 55 so that the pressure is uniform as between the two. To such end hose fittings are provided for the proximal openings, and namely the rear opening 53 of the front tank 25 and the front opening 52 of the rear tank 26. The other two end openings, and namely the front opening 52 of the tank 25 and the rear opening 53 of tank 26, are each plugged. A hose fitting is provided for the opening 54 of one of the tanks, and the corresponding opening in the other tank is plugged, this latter fitting accommodating a hose 56 extending from a levelling valve 57. Two levelling valves are employed, one for one side and the other for the other side of the vehicle. Supplied with pressure air through hoses 60, such valves may be controlled in any suitable manner, the hook-up here illustrated providing, for each valve, a horizontal activating lever 61 connecting through a lift rod 62 with a telescoping shaft 63 extending longitudinally between the two axles. Straps 64 permit flexure as between the ends of shaft 63 and the axles. Rubber grommets 65 produce flexible joints at both the lower and upper ends of the lift rods.

It will be seen that each tank is provided with a through-opening 67 of comparatively large diameter lying immediately to the front of the saddle opening. The purpose thereof is to accommodate a rod 68 or other suitable control for the vehicle's brakes.

It is thought that the structural nature of the invention, the manner of operation, and the functions accomplished will have been clearly understood from the detailed description of my now preferred illustrated embodiment. Changes will suggest themselves and can be resorted to without departing from the spirit of the invention, wherefore it is my intention that no limitations be implied and that the hereto annexed claims to be given the broadest interpretation to which the employed language fairly admits.

What I claim is:

1. In a tandem rear axle vehicle having at each side thereof and for each of the tandem rear axles a respective elongated longitudinally disposed airtight tank each journaled by one end thereof to the vehicle frame for swing movement about a coinciding transverse horizontal axis, the tandem rear axles, said axles underlying said tanks and having each end of each axle secured to the free end of the related tank, a respective vertical air spring for each side of the vehicle bearing by its lower end upon the free end of the related tank and by its upper end against the vehicle frame, a respective connection for each side of the vehicle common to both of the tanks related to said side and extending through a respective levelling valve from a pressure source of air supply to the interior of both tanks, means for regulating said levelling valves to accommodate the vehicle to changing load conditions, and a constantly open connection from the interior of each tank to the interior of the related air spring.

2. In vehicle suspension, a vehicle frame, a pair of axles, and means including air springs resiliently supporting said frame on said axles, said means comprising, at each side of the vehicle, a respective air-tight hollow bolster for each axle each secured to the related axle intermediate its ends and with one end journaled to the frame at a point longitudinally spaced from the axle for swing movement of the bolster about a transverse horizontal axis, a respective means so connecting the free end of each bolster to the frame that the bolster is guidably held to swing movement in an established vertical plane, there being a respective air spring for each bolster occupying an intervening position between the bolster and the frame and communicating by its interior directly with the interior of the related bolster, the two bolsters being structurally identical each providing three openings to the interior two of which are located one proximate to one end and the other proximate to the other end with the aft opening of the front bolster connected by hose to the front opening of the aft bolster and with one of the remaining two openings of one bolster connected by hose to a levelling valve, each of the remaining three openings being plugged.

3. In a tandem rear axle vehicle having at each side thereof and for each of the tandem rear axles a respective elongated longitudinally disposed beam each presenting an air-tight chamber therein and each journaled by one end thereof to the vehicle frame for swing movement about a coinciding transverse horizontal axis, the tandem rear axles, each end of each axle being secured to the free end of the related beam, a respective vertical air spring for each side of the vehicle bearing by its lower end upon the free end of the related beam and by its upper end against the vehicle frame, a respective connection for each side of the vehicle common to both of the beams related to said side and extending through a respective levelling valve from a pressure source of air supply to said air-tight chambers of both beams, means for regulating said levelling valves to accommodate the vehicle to changing load conditions, and a constantly open connection from said air-tight chamber of each beam to the interior of the related air spring.

References Cited in the file of this patent

UNITED STATES PATENTS

| | | |
|---|---|---|
| 1,445,486 | Cats | Feb. 13, 1923 |
| 1,727,737 | Thorp | Sept. 10, 1929 |
| 2,280,347 | Olley | Apr. 21, 1942 |
| 2,367,817 | Brown | Jan. 23, 1945 |
| 2,637,569 | Turner | May 5, 1953 |
| 2,660,450 | Stigum | Nov. 24, 1953 |
| 2,713,498 | Brown | July 19, 1955 |
| 2,742,301 | Pointer | Apr. 17, 1956 |
| 2,755,097 | Elconin | July 17, 1956 |
| 2,814,480 | Clark | Nov. 26, 1957 |
| 2,827,282 | Weiss | Mar. 18, 1958 |